United States Patent
Nosker et al.

(10) Patent No.: US 6,191,228 B1
(45) Date of Patent: Feb. 20, 2001

(54) USE OF RECYCLED PLASTICS FOR PREPARING HIGH PERFORMANCE COMPOSITE RAILROAD TIES

(75) Inventors: Thomas Nosker, Stockton; Richard Renfree, Scotch Plains; James Kerstein, Watchung, all of NJ (US)

(73) Assignee: Polywood Inc., Edison, NJ (US)

( * ) Notice: Under 35 U.S.C. 154(b), the term of this patent shall be extended for 0 days.

(21) Appl. No.: 09/237,917

(22) Filed: Jan. 27, 1999

(51) Int. Cl.⁷ .................. C08L 23/00; C08L 25/02; E01B 3/44; E01B 3/46; E01B 31/20
(52) U.S. Cl. .................. 525/240; 525/241; 238/84; 238/85; 238/106
(58) Field of Search .................. 525/240, 241; 238/84, 85, 106

(56) References Cited

U.S. PATENT DOCUMENTS

| | | | |
|---|---|---|---|
| 4,997,609 | 3/1991 | Neefe | 264/122 |
| 5,055,350 | 10/1991 | Neefe | 428/331 |
| 5,094,905 | 3/1992 | Murray | 428/218 |
| 5,238,734 | 8/1993 | Murray | 428/292 |
| 5,298,214 | 3/1994 | Morrow et al. | 264/211 |
| 5,789,477 | 8/1998 | Nosker et al. | 524/494 |

OTHER PUBLICATIONS

Nosker et al., "Recycled Polystyrene, Add Valve to Commingled Products," Plastics Engineering, 1990.
Nosker et al., "Improvements in the Properties of Commingled Plastics by the Selective Mixing of Plastic Wastes," SPE RETEC, Oct. 1989.
Renfree et al., "Physical Characteristics and properties of Profile Extrusions Produced from Post Consumer Commingled Plastic Wastes," SPE ANTEC '89, PP. 1809–1811.
Renfree et al., "Dual Phase, Co–Continuous Morphology from Mixtures of Recycled Polystyrene/Curbside Tailings Materials," SPE ANTEC '92, PP. 2396–2400.

*Primary Examiner*—Nathan M. Nutter
(74) *Attorney, Agent, or Firm*—Millen, White, Zelano & Branigan, P.C.

(57) ABSTRACT

A method of maintaining proper distance between railroad rails is disclosed. The method utilizes railroad ties manufactured from a composite of polystyrene and polyolefin components, preferably obtained from recycled plastics. The composite exhibits a dual phase morphology wherein the two phases, polystyrene and polyolefin, intertwine and remain continuous throughout the material.

24 Claims, 2 Drawing Sheets

USE OF RECYCLED PLASTICS FOR PREPARING HIGH PERFORMANCE COMPOSITE RAILROAD TIES

SUMMARY OF THE INVENTION

The present invention relates to use of plastic materials for manufacturing railroad ties. In particular, the invention relates to manufacturing high performance railroad ties from recycled plastics containing polyolefin and polystyrene materials.

Railroad ties serve the function of not only supporting the rails but also maintaining the proper distance between rails under expected loads. Failure to adequately serve either of these roles can lead to a derailment, endangering both lives and property. Yet, railroad ties are subject to extremely harsh conditions, thereby increasing the chance of derailment.

Ties are exposed to large temperature variations, excessive amounts of ultraviolet light, severe weather conditions, attack from microorganisms and insects, and stress imposed by use.

In general, a railroad tie must be able to maintain the desired distance between and under a lateral load of 24,000 lbs., a static vertical load of 39,000 lbs., and a dynamic vertical load of 140,000 lbs. Thus, for a typical railway wherein the distance (gauge) between the rails is 56.5 inches, the ties must be able to maintain this distance without increasing by more than 0.125 inches, under the expected temperature and load variations, so as to prevent derailment.

To effectively withstand such loads, the tie material must possess both stiffness and strength. In this regard, a railroad tie should, in general, exhibit the following physical properties:

compression modulus: at least about 172,000 psi flexural modulus: at least about 172,000 psi compression yield stress: at least about 3,000 psi compression strength: at least about 3,000 psi flexural strength: at least about 3,000 psi Another factor regarding maintaining the proper distance between rails is thermal expansion. To be suitable as a railroad tie, the material must exhibit a low thermal expansion. Preferably, the material has a coefficient of thermal expansion of less than $6 \times 10^{-5}$ in/in $\cdot °$ F.

To prevent the occurrence of accidents, the materials used for manufacturing railroad ties need to be stiff, strong and resistant to ultraviolet light, temperature fluctuations, and microbe/insect attack. Also, the material should be nonconductive to preclude electrical flow between the rails. For example, for freight railways, electrical signals are sent through the rails for purposes of communication between the front and back of the train. For passenger railways, electrical power is often sent through the rails themselves. Therefore, to prevent electrical shorts between the rails, the ties supporting the rails should be made from nonconductive materials.

The tie material should also be durable to avoid deterioration due to abrasion during use. For example, one form of abrasion associated with railroad ties is tie seat abrasion. This occurs when the tie plates cut into the ties. Ties that are made from materials that are stiffer and stronger than wood in the direction perpendicular to the tie axis are better at alleviating tie seat abrasion.

Since the rails are to be attached to the ties, the tie material also has to be suitable for use with typical types of fasteners, such as those used for wood materials, e.g., nails, screws, spikes, bolts, etc.

Typically, railroad ties are manufactured from wood, and to some extent steel-reinforced concrete. While wood is a relatively inexpensive material, it is very susceptible to attack from microorganisms such as fungi and insects, which will weaken and deteriorate the tie. To compensate for this, wooden railroad ties are chemically treated to resist such attacks. Examples of such chemical treatments are creosote treatment and chromate/copper/arsenic treatment. These treatments greatly increase costs. Further, chemical treatments only delay attack, not prevent it. Wooden ties are also quite susceptible to damage from harsh weather conditions and excessive sunlight. As a result of these drawbacks, wooden ties require frequent replacement or regauging, again increasing costs, in materials, labor, and disposal. Replacement and/or regauging costs can be quite substantial as ties are being utilized in numbers of about 3000 ties per mile.

Similarly, steel-reinforced concrete railroad ties are also susceptible to degrading forces, for example, abrasion, stress and strain. In fact, concrete ties have been found to cause premature failure of rails. This is because concrete ties are generally very stiff. As a result, when placed at the standard distance, the ties do not aid in absorbing the stress imposed on the rails thereby forcing the rails to flex more between the ties under load. To address this problem, concrete ties are often spaced closer together than wooden ties. This, of course, leads to increased costs.

Damp and freezing weather conditions cause damage to both wooden and concrete railroad ties alike. Water from rain or snow can penetrate into the surface of a wooden or concrete railroad tie. If the tie is then exposed to freezing conditions, the water will expand as it freezes, causing the formation of cracks thereby weakening the tie. In the case of reinforced concrete ties, such cracks can also lead to oxidation of the reinforcement bars.

Attempts have been made to manufacture railroad ties from other materials. For example, Murray, U.S. Pat. Nos. 5,094,905 and 5,238,734, discloses making railroad ties from recycled tires. The costs, however, associated with recycling tires is high. Also, Murray uses adhesives such as epoxies to bind together the granulates of recycled tires. Such adhesives further contribute to high manufacturing costs. In addition, the expected modulus, that is the stiffness, of such a material would be quite low. It is unlikely that a tie made from such material would be able to maintain the proper distance between the rails at the expected load levels. To date, railroad ties manufactured from recycled tires have not found broad commercial application.

On the other hand, plastic polymers and plastic composite materials offer a viable alternative to wood and concrete. Manufactured plastics composites can exhibit the necessary stiffness strength, resistance to heat expansion and deformation, as well as increased resistance to degradation from moisture, excessive sunlight and attacks by microorganisms and insects. Plastic ties would also have a longer expected service life thereby reducing the labor and material costs associated with replacement.

Due to the inherent resistance to microorganisms, insects, and moisture, plastic ties obviate the need for chemical treatments used for wooden ties. This represents not only a cost savings, but will also eliminate waste disposal problems for chemically treated wooden ties.

However, the cost of raw materials is a disadvantage of plastic polymers and plastic composites. Virgin polymer resins can be quite expensive thereby making their use economically unfeasible.

Still attempts have been made to manufacture general replacement lumber from plastics and plastic composites.

Trimax of Long Island Inc. manufactures a lumber substitute made from a stiff plastic composite material made of fiberglass and high density polyethylene (HDPE). A typical lumber product made solely of HDPE has a relatively high compression strength of about 3,000 psi, but has a low stiffness, i.e., compression modulus, of only about 100,000 psi. In comparison to HDPE alone, the Trimax material has a higher stiffness (i.e., compression modulus of about 200,000 psi) but a lower strength (compression strength of about 2,000 psi). Due to its low strength, the material is unsuitable for use as a railroad tie.

Eaglebrook Products Inc. also manufactures a synthetic lumber substitute. The material is made from relatively pure HDPE and, therefore, exhibits a comparatively low compression modulus and relatively high coefficient of thermal expansion. For plastic lumber HDPE the coefficient thermal expansion is greater than about $7 \times 10^{-5}$ in/in $\cdot °$ F. To date, neither of the products manufactured by Trimax and Eaglebrook have found any significant use as materials for railroad ties.

Neefe, U.S. Pat. Nos. 4,997,609 and 5,055,350, use compression molding to manufacture a composite railroad tie from sand and granulated recycled plastics. These two components are held together by an adhesive coating material, i.e., sugar or polystyrene.

A recent patent, Nosker et al. (U.S. Pat. No. 5,789,477), incorporated herein by reference, describes the requirements of materials used for railroad ties as well as the disadvantages and pitfalls of the known wooden and steel-reinforced concrete railroad ties. As a substitute material, Nosker et al. disclose a composite made from coated fibers, such as fiber glass or carbon fibers, distributed within a polymer component containing about 80–100% high density polyethylene (HDPE). The polymer component can be made from recycled plastics.

Recycled plastic materials provide an inexpensive source of plastic. However, these materials are often difficult to reformulate into useable products, especially products with consistent mechanical properties.

Recycled plastics are typically obtained by curbside collection, which itself presents problems as to quality and consistency. The types of plastic materials that are typically designated for curbside recycling are unpigmented HDPE and PET (polyethylene terephthalate). These materials are singled out for plastic resin recovery processes, the recycled materials being used in place of virgin resins. However, only about 80% of the collected recycled plastics fall within these two acceptable categories. The remaining plastics are generally unacceptable for mainstream resin recovery recycling.

Fortunately, some industries have standardized their plastic package materials. For example, plastic milk bottles are made from unpigmented HDPE, while plastic carbonated beverage bottles are made from PET (one-piece containers) or PET/HDPE (two-piece containers). These containers are easily identified and thus are relatively easy to segregate, thereby facilitating the recycling of these two plastics. This is the reason why these two types of plastic are designated for acceptable curbside recycling designated for resin recovery.

On the other hand, plastic containers used for household cleaners, cooking oils, foods, motor oils, and the like, exists in numerous different package designs and types. These containers are manufactured from a variety of polymers in addition to HDPE and PET, for example, polyvinyl chloride (PVC), polypropylene (PP), and polystyrene (PS). Individual manufacturers often specify particular colors, shapes, and plastic materials for their particular application. As a result, many of these containers are not easily identifiable. Separation by resin type is therefore difficult and expensive. Furthermore, due to the varied pigments and additives used in manufacturing, these plastics are of little value for recycling.

After the PET beverages and unpigmented HDPE containers have been removed from the recycled materials, the remaining plastic containers are known as commingled plastics. The following table provides an example composition of commingled plastics.

TABLE 1

| PERCENTAGE OF EACH PLASTIC TYPE IN MIX | |
|---|---|
| TYPE | NJCT[1] |
| PET SODA | — |
| HDPE, NON-MILK | 90.2 |
| HDPE, MILK + $H_2O$ | — |
| PVC | 3.2 |
| PET, NON-SODA | 4.5 |
| PP | 0.5 |
| OTHER (#7) | 1.6 |
| LDPE | — |
| PS | — |

[1]-New Jersey Curbside Tailings after PET soda and HDPE milk/water containers removed.

In the field of polymer science, such a collection of diverse plastics materials are not considered to be capable of "blending," so as to form a compatible product. Still, it is possible to process the mixture into large cross-section products. However, as shown above, commingled plastics, in general, are composed largely of polyolefms. This material when extruded results in products having a low-modulus and a relatively flexible nature.

Recently, however, research has shown that objects possessing both strength and utility can be obtained by the mixing of certain recycled polymeric materials previously thought to be incompatible. For example, the Center for Plastics Recycling Research (CPRR) at Rutgers University has investigated enhancing the mechanical properties of extruded commingled plastics, made up largely of polyethylene, specifically, by combining the commingled plastic waste streams with polystyrene. See, e.g., Nosker et al., "Recycled Polystyrene, Add Valve to Commingled Products," Plastics Engineering, 1990; Nosker et al., "Improvements in the Properties of Commingled Plastics by the Selective Mixing of Plastic Wastes," SPE RETEC, October 1989; and Renfree et al., "Physical Characteristics and properties of Profile Extrusions Produced from Post Consumer Commingled Plastic Wastes," SPE ANTEC '89, pp. 1809–11.

As described in, for example, Morrow et al. U.S. Pat. No. 5,298,214, hereby incorporated by reference, polystyrene can be blended with a "mixed plastics"component from a recycling stream to produce materials that behave mechanically and appear morphologically like fiber reinforced composites. Moreover, there exists a unique composition range within which mechanical properties are optimized. In this range, the morphology, as determined by scanning electron microscopy, of both the polystyrene component and predominantly polyolefin component, obtained from the "mixed plastics," exist as a dual phase microstructure with both components forming three dimensional networks that are integrated and interpenetrating with one another. See also Renfree et al., "Dual Phase, Co-Continuous Morphology from Mixtures of Recycled Polystyrene/Curbside Tailings Materials," SPE ANTEC '92, pp. 2396–2400, hereby incorporated by reference.

In this type of dual phase co-continuous structure, the two phases intertwine in such a way that both phases remain continuous throughout the material. This morphology is analogous to that of a sponge soaked in water where both sponge and water form continuous systems. The resulting microstructure in this type of system enables each phase to share in the load bearing capability of the material. This reduces somewhat the need for efficient stress transfer between the phases required for dispersed phase blends.

Determining the composition ranges at which dual phase co-continuity occurs can be estimated by selecting the volume ratio of the two blend components to approximately equal the viscosity ratio.

Based on experimental observations that the phase with the lower viscosity or the higher volume fraction, tended to form the continuous phase, Jordhamo, Manson, and Sperling, Polym. Eng. Sci., 26(8), 517 (1986), suggested a semi-empirical expression which relates the region of expected dual phase co-continuity to the viscosity ratio and volume ratio of the blend components. Their paper asserts that the condition of dual phase co-continuity can be achieved by the application of shear to a polymer blend system close to the phase inversion region. As described by equation (1), the model predicts that phase inversion should occur when the viscosity ratio and the volume ratio are about equal, i.e., when $$\frac{\eta_1}{\eta_2} \approx \frac{\phi_1}{\phi_2} \qquad (1)$$

wherein $\eta_i$ is the viscosity of phase i and $\phi_1$ is the volume fraction of phase i. As can be seen, the model sets the viscosity ratio as being approximately equal to the volumetric ratio. In the context of the invention, and in particular for the polystyrene and polyolefin system, the ratio of viscosity ratio to volumetric ratio is generally about 0.5:1.5, preferably about 0.75:1.25, especially about 0.8:1.2.

Figure 1:
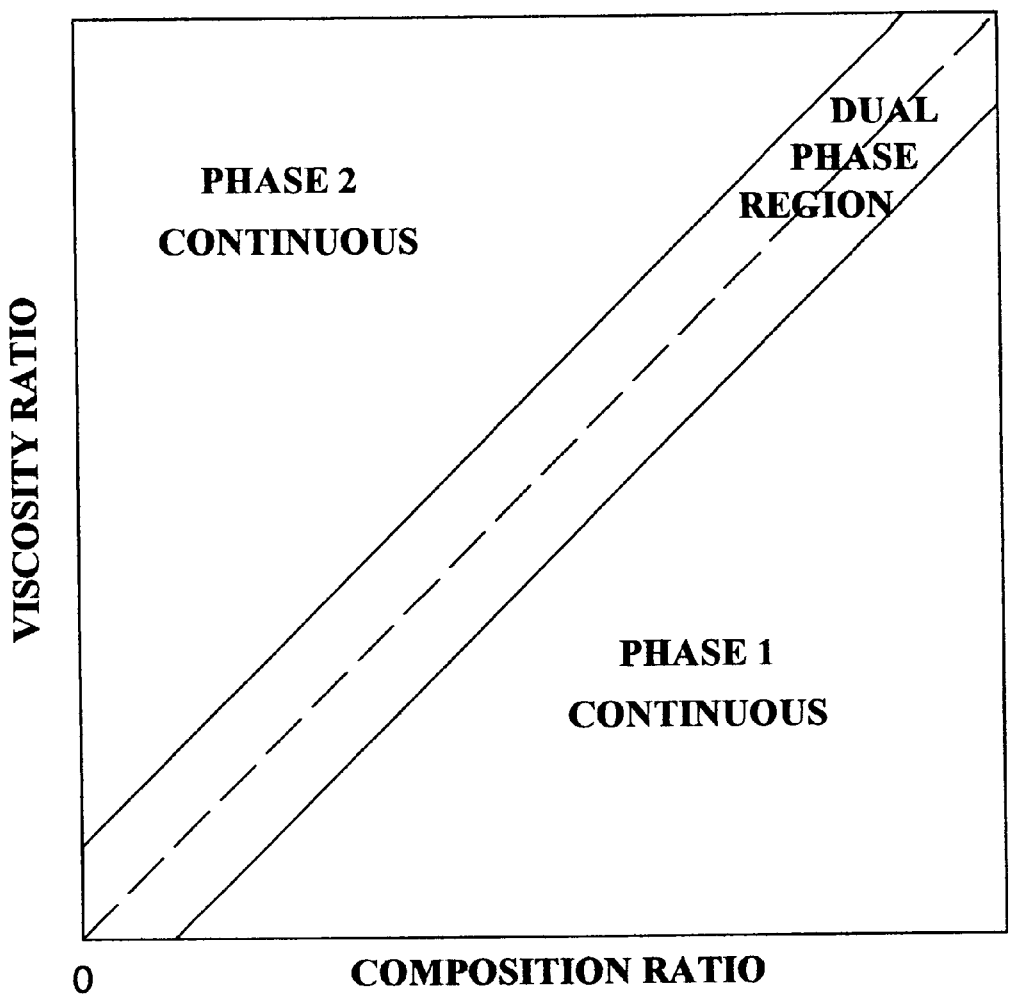
FIG. 1 generally illustrates the dual phase region as defined by viscosity ratio and compositional ratio.

FIG. 1 graphically illustrates the above mentioned model defined by equation (1). The dashed line represents the equality between the viscosity ratio and the volumetric ratio. The two dark lines on either side thereof represent the borders of the dual phase region.

The material described in Morrow et al. exhibits this two-phase microstructure. One phase consists essentially of polystyrene and the other consists essentially of polyolefin. At polystyrene contents of 30–50% the material exhibits a compression modulus of 197,600–239,000 psi, a compression yield stress of 4350–5320 psi, and compressive strength of 4350–5320 psi. Material in accordance with the Morrow process is being manufactured as plastic lumber by Polywood Inc. for use as, e.g., decking, walkways, fencing, posts and docks.

While the strength of this material makes it an excellent candidate as substitute lumber, it is susceptible to corrosion from some organic solvents. For the example, due to its high polystyrene content and the three dimensional structure formed therefrom, the material is not suitable for use in areas were exposure to organic solvents like gasoline is probable. Polystyrene will dissolve when contacted with gasoline. Due to the three dimensional network of the polystyrene component, once gasoline has contacted the material it will penetrate into the interior and weaken the entire composite.

Railroad ties are subject to exposure to not only water, but also grease, mineral oil and diesel fuel. The possibility of contact with such materials would deter use of the Morrow et al. material as a railroad tie due to susceptibility to dissolution of its polystyrene component.

However, while gasoline does dissolve polystyrene, diesel fuel and mineral oil do not. Thus, even a material having a high polystyrene content can be used for railroad ties.

Therefore, in accordance with the recognition of the suitability of high content polystyrene materials, the present invention is directed to the use of polystyrene/polyolefin composite materials for use as railroad ties.

In accordance with one aspect of the invention, there is provided a method for maintaining desired spacing between railroad rails by attachment of the rails to at least one railroad tie, the improvement wherein:

the at least one railroad tie is formed from a plastic composite material comprising 20–50 wt% of a polystyrene component and 50–80 wt% of a polyolefin component wherein the polystyrene component contains at least 90 wt % polystyrene and the polyolefin component contains at least 75 wt% high density polyethylene.

In accordance with another aspect of the invention, there is provided a method of providing a weight bearing support surface for railroad rails by attachment of the rails to at least one railroad tie, the improvement wherein:

the at least one railroad tie is formed from a plastic composite material comprising 20–50 wt % of a polystyrene component and 50–80 wt % of a polyolefin component wherein the polystyrene component contains at least 90 wt % polystyrene and the polyolefin component contains at least 75 wt % high density polyethylene.

In accordance with a further aspect of the invention there is provided a method of maintaining desired spacing between railroad rails by attachment of the rails to at least one railroad tie, the improvement wherein:

the at least one railroad tie is formed by extrusion of a plastic melt blend containing a polystyrene component and a polyolefin component, and wherein, within the plastic melt blend, the ratio of the viscosity of the polystyrene component to the viscosity of the polyolefin component is approximately equal to the ratio of the volume of the polystyrene component to the volume of the polyolefin component.

Another aspect of the invention is an article of manufacture comprising:

at least one railroad rail, e.g., two or three rails, and at least one railroad tie, wherein the at least one railroad rail is fastened to the at least one railroad tie and the tie is formed from a composite material comprising 20–50 wt % of a polystyrene component and 50–80 wt % of a polyolefin component, the polystyrene component containing at least 90 wt % polystyrene and the polyolefin component containing at least 75 wt % high density polyethylene.

Another aspect of the invention is a continuous process for extruding composite railroad ties comprising:

introducing resin into an extruder, the resin comprising 20–50 wt % of a polystyrene component and 50–80 wt % of a polyolefin component, wherein the polystyrene component contains at least 90 wt % polystyrene and the polyolefin component contains at least 75 wt % high density polyethylene;

heating the resin within the extruder to convert the resin into a molten state;

extruding the molten material through a cooled die having at least one orifice in the shape of the cross-section of a railroad tie, wherein during passage through the cooled die an outer solid skin forms on the extruded material, said outer solid skin having a thickness sufficient to maintain the shape of the material through subsequent stages;

conveying the extruded material through subsequent cooling stages whereby the material is sufficiently cooled to permit cutting; and cutting the extruded material into desired lengths to form composite railroad ties.

Upon further study of the specification and appended claims, further aspects and advantages of the invention will become readily apparent to those skilled in the art.

In accordance with the invention, the composite material consists essentially of a polystyrene component in the amount of 20–50 wt. % and a polyolefin component of 50–80 wt. %. Preferably, the composite contains about 25 to 45 wt. %, especially 30 to 40 wt. % of the polystyrene component. Further, the composite preferably contains about 55 to 75 wt. %, especially about 60 to 70 wt. % of the polyolefin component. A particularly preferred embodiment of the composite contains 35 wt. % of the polystyrene component and 65 wt. % of the polyolefin component.

The polystyrene component is preferably 100 wt. % polystyrene although a minor manner of impurities, organic or inorganic, may be included such as foodstuffs. These impurities, on a dried basis, can be present in an amount of up to about 10 wt. %. The polyolefin component can be made from a mixture of polyolefin materials, e.g., high-density polyethylene, low density polyethylene, polypropylene, ethylene-propylene copolymers and the like. The polyolefin component should contain at least 75 wt. % high density polyethylene to insure formation of a dual phase co-continuous interlocking three-dimensional network between the polystyrene component and the polyolefin component.

While both polystyrene component and polyolefin component can be made from virgin materials, these materials are preferably formed from recycled plastics. Sources of recycled polystyrene include styrofoam cups and containers, rigid styrene tableware, clothing hangers, and other containers. The recycled polystyrene can be utilized in any of its commonly available forms, for example, foamed (expanded) polystyrene, crystal polystyrene (general purpose), and high impact polystyrene. Plastics for the polyolefin component can be obtained from the recycling of PET and HDPE beverage containers and other containers (e.g., 5 gallon pails and 55 gallon drums). However, the polyolefin can also be obtained from the mixed plastics portion of recycled stream obtained after removal of PET and HDPE beverage containers. The ability to utilize this mixed plastics or commingled plastic portion provides both economic and environmental advantages.

The polyolefin component preferably contains at least 80 wt. % high-density polyethylene and especially 90 wt. % high-density polyethylene. Other possible materials within the polyolefin component include up to 25 wt. % of polyvinyl chloride; middle, low and/or low linear polyethylene; polypropylene; polystyrene; polyethylene terephthalate; polyolefin copolymers; and mixtures thereof.

In addition to the polystyrene and polyolefin components, the composite may contain further additives. For example, the material used to make the composite can contain small amounts of a blowing agent to reduce the number and size of voids formed within the material during cooling. The amount of can be, for example, less than 0.3 wt. %, e.g., about 0.03 wt. %. The blowing agent, e.g., azidocarbonamide, can be mixed in with the resin powder. Alternatively, other foaming agents or gases can be directly metered into the extruder. Other additives such as pigments UV resistant agents can also be added, for example, carbon black.

While the composite material is described in terms of the polystyrene/polyolefin system, it is possible using equation (1) to utilize other materials to achieve a composite possessing the desired dual-phase morphology of wherein the phases intertwine such that they remain continuous throughout the composite material.

The composite material is resistant to attack by microbes and insects and thus does not require expensive chemical treatments. Also, the material is resistant to degradation from exposure to ultraviolet light as well as damp, freezing conditions.

Preferably, the composite material has a compression modulus of at least about 172,000 psi, especially at least about 200,000 psi. The composite material further exhibits a compression strength of preferably at least about 3,000 psi, especially at least about 3,500 psi, and a compression yield stress of preferably at least about 3,000 psi, especially at least about 3,500 psi.

The flexural modulus of the composite material is preferably at least about 172,000 psi, especially at least about 200,000 psi, and the flexural strength is preferably at least about 3,000 psi, especially at least about 3,500 psi.

Further, the composite material preferably has a coefficient of thermal expansion of less than about $6.5 \times 10^{-5}$ in/in-° F, especially less than about $6.0 \times 10^{-5}$ in/in-° F.

To achieve the dual phase morphology, the amounts polystyrene and polyolefin components are selected so that their volume ratio is approximately equivalent to their viscosity ratio at the processing temperature. Thus, melt viscosity is an important parameter for achieving the dual phase morphology.

The composite material can be prepared by granulating the polystyrene and polyolefin components, mixing the granulated materials together and then introducing the granulate mixture into a suitable extruder.

The size of railroad ties will vary from country to country. In the U.S., the standard railroad tie size for main rail lines is about 9 inches wide by 7 inches thick by approximately 8.5 feet long. For short lines, the size of the ties is about 6 inches by 8 inches by 8.5 feet. For some freight and passenger lines in which a third rail is used, the ties can be 7 inches by 9 inches by 10 feet or 6 inches by 8 inches by 10 feet. In fact, for switch sets of rails the ties can be even longer, for example, up to 17 feet long. Using an appropriate size extruder, materials in accordance with the standard U.S. size of railroad ties can be prepared.

The composite railroad ties can be made by either a batch process or continuous process. In a batch process, the polystyrene and polyolefin components in the form of resin flakes can be mixed together dry in the desired weight percentages. Mixing can occur within the extruder feed hopper or prior to the materials being introduced into the hopper via an appropriate mixing device, for example, a blender. The materials can also be fed into the hopper using vibratory feeders. The hopper feeds the mixed material into a suitable extruder such as a single screw extruder. Other suitable extruders are, for example, rotary extruders and twin screw extruders. Examples of suitable extruders are the 4½" Davis Standard model #45T S/N E766, 4" Davis Standard model #450H S/N G-8733, Advanced Recycling Technology model # ET-1/6280 and Advanced Recycling Technology model #ART/MTl/Mark 10. Within the extruder, the material as heated into a molten state, for example, at temperatures of about 300° F. to 400° F., e.g., 350° F. The molten material is discharged from the extruder through a die and into a mold, e.g., a mold which is 7"×9" in cross-section and 8½ feet long. Material is discharged from the die under low pressure, e.g., no more than about 2000 psi. The extrusion rate is generally greater than about 100 lbs/hr, e.g., about 400 lbs/hr or greater. The exterior of the mold is cooled during the extrusion process by any suitable means, e.g., a water bath, water spray, water jacket, air convection, etc. As a result of this cooling, the outer layer of the composite material solidifies thereby forming a solid skin. Thereafter, the molded composite material is allowed to cool to room temperature.

The material exits the die through an orifice which generally has a cross section smaller than that of the mold. For example, the die orifice can be about ¾–2 inches in diameter. Larger die orifices are of course possible when using large extruders. During the initial stages of filling the mold, the material enters the mold and contacts a plug. The plug is in the form of a plunger and serves to provide a uniform end surface during molding as well as to provide back pressure. As the mold fills, the back pressure increases and pushes the plug backwards through the mold.

To fill a mold (e.g., 7"×9"×8½') generally takes about 1 to 1½ hours at an extrusion rate of about 160–200 lbs/hr. After the mold is filled, the composite tie takes at least about 4 hours to cool to room temperature.

It is also possible to manufacture the composite railroad ties by a continuous process. In such a process, the materials can be mixed in the same way as in the batch process. The dry mixed materials are then fed from a hopper into a suitable extruder. The material can be extruded into a single profile, i.e., through a single die orifice. Alternatively, a manifold can be positioned before a die having multiple die orifices to simultaneously extrude multiple profiles.

In the continuous process the material is extruded through an elongated externally cooled die. Here again cooling can be provided by any suitable means such as water bath or a water jacket. As the material travels through the die, the external cooling results in the formation of a solid outer skin. This skin aids in maintaining the integrity of the extruded material as it exits the die and passes onto further cooling stages. As the material exits the die, it is both supported and pulled by a conveying means such as a conveyor belt, belt puller, rollers, or hydraulics.

The conveying means moves the extruded material through additional cooling stages such as vacuum calibration units. Following the subsequent cooling stages, the material can be automatically cut into the desired lengths.

As mentioned above the cooled die is elongated. For a low capacity extruder, e.g., extruding material into a single profile at a rate of about 100–200 lbs/hr, the cooled die can be, for example, 34 to 50 feet. Conversely, a higher capacity extruder (e.g., about 1,500–5,000 lbs/hr), with a manifold for providing multiple profiles, may have an even longer cooled die, e.g., about 120 feet. The cooled die is long enough so that the material exiting the die has a sufficiently thick solid skin to maintain the integrity of the profile of extruded material through the rest of the cooling process. As a general approximation, the amount of time spent in the cooled die should be about ¼ of the time required to cool the material to a point sufficient to be cut into desired lengths. For example, at any extrusion rate, the material should spend about an hour within the cooled die. Thus, the extrusion rate is an important factor in determining the appropriate length of the cooled die.

In comparison to the batch process, in the continuous process the extruded material is subjected to a continuous level of back pressure. Conversely, in the batch process, the material as it initially enters the mold encounters no back pressure. As the mold fills up, the back pressure builds. Due to the increasing back pressure, the material molded by the batch process does not exhibit a uniform density throughout its entire length. See, for example, Plastics Recycling, R. J. Ehrig (editor), Karl Hanser Verlag, chapter 9, §9.4.4, page 199 (1992). On the other hand, due to the continuous back pressure, the material manufactured by the continuous process exhibits a more uniform density.

Further details on extrusion of polystyrene/polyolefin composite material are provided in Morrow et al. U.S. Pat. NO. 5,298,214.

In the foregoing and in the following example, all temperatures are set forth uncorrected in degrees Celsius; and, unless otherwise indicated, all parts and percentages are by weight.

The entire disclosure of all applications, patents and publications, cited above and below, is hereby incorporated by reference.

Compression modulus, compression strength, and compression yield stress are measured herein in accordance with ASTM Test No. D6108. Flexural modulus, flexural strength and yield stress (in stress) are measured herein in accordance with ASTM Test No. D6109.

EXAMPLE

To produce a product containing the co-continuous structure with mixtures of recycled and/or virgin polymers, using the relationship proposed by Jordhamo, Manson, and Sperling, the viscosity and the volume fraction of each component at the particular processing temperature needs to be determined. In analyzing the materials used in accordance with the invention one can, for convenience, consider the composite to consist of two components, a polyolefinic component and a polystyrene component. In other words, one can ignore that the polyolefin component may be made up of different polymers. This simplifies the analysis and allows the "bulk" viscosity determined for the polyolefin to be used in the calculations.

Since polymers are viscoelasfic, viscosity measurements can, for example, be performed using a Rheometrics Inc. RMS-800 mechanical spectrometer (Rheometrics, Inc. in Piscataway, N.J.) configured in the parallel plate geometry. Viscosity as a function of frequency can be determined at the processing temperature used to produce product as well as viscosity as a function of temperature.

One can convert from weight percent of the mixture at room temperature to volume percent at the processing temperature, by use of the densities of the materials at the processing temperature. The densities of the materials can be determined utilizing, for example, a Kayeness brand extrusion plastometer with the barrel temperature set at the processing temperature. It is known that one inch of piston travel in the extrusion plastometer displaces 1.804 cubic centimeters of volume. The material extruded after one inch piston travel is collected for all samples and weighed. From this information the densities of the materials can be determined.

Once the densities are determined, the volume percent of polystyrene material at the processing temperature can be determined from $$VOL\%_{PS} = \frac{M_{PS}/\rho_{PS}}{M_{PS}/\rho_{PS} + M_{polyolefin}/\rho_{polyolefin}} \times 100$$

where $M_{PS}$ is the mass of the polystyrene material and $\rho_{PS}$ is the density of the polystyrene material at the processing temperature.

As an example, this procedure was performed on three PS/polyolefin systems. Two were plastic lumber compositions (same polyolefin (NJCT), different polystyrenes, (MPS and PPS)) and the other was an extrusion grade composition (polyolefin, NJCT floats and polystyrene (MPS)). For each system, the materials were produced at various PS/polyolefin compositions, which are indicated in Table 2, and examined for evidence of dual phase, co-continuous morphology. The terms used in Table 2 are defined as follows:

NJCT—"New Jersey Curb Tailings", i.e., commingled plastics as described above in Table 1.

NJCT floats—clean, mainly polyolefinic mixture obtained by melt filtering the commingled plastics described in Table 1.

MPS—Post industrial polystyrene obtained from Mobil Chemical Company's expanded polystyrene regional operation.

PPS—Post consumer polystyrene obtained from Plastics Again, Inc.

Results for estimated volume percents of the different compositions as well as volume ratios and viscosity ratios are presented in Table 2. The viscosity ratios are measured at 212° C. or 220° C. The general range for the "processing temperature" for the polystyrene/polyolefin system is about 180–220° C.

Figure 2:
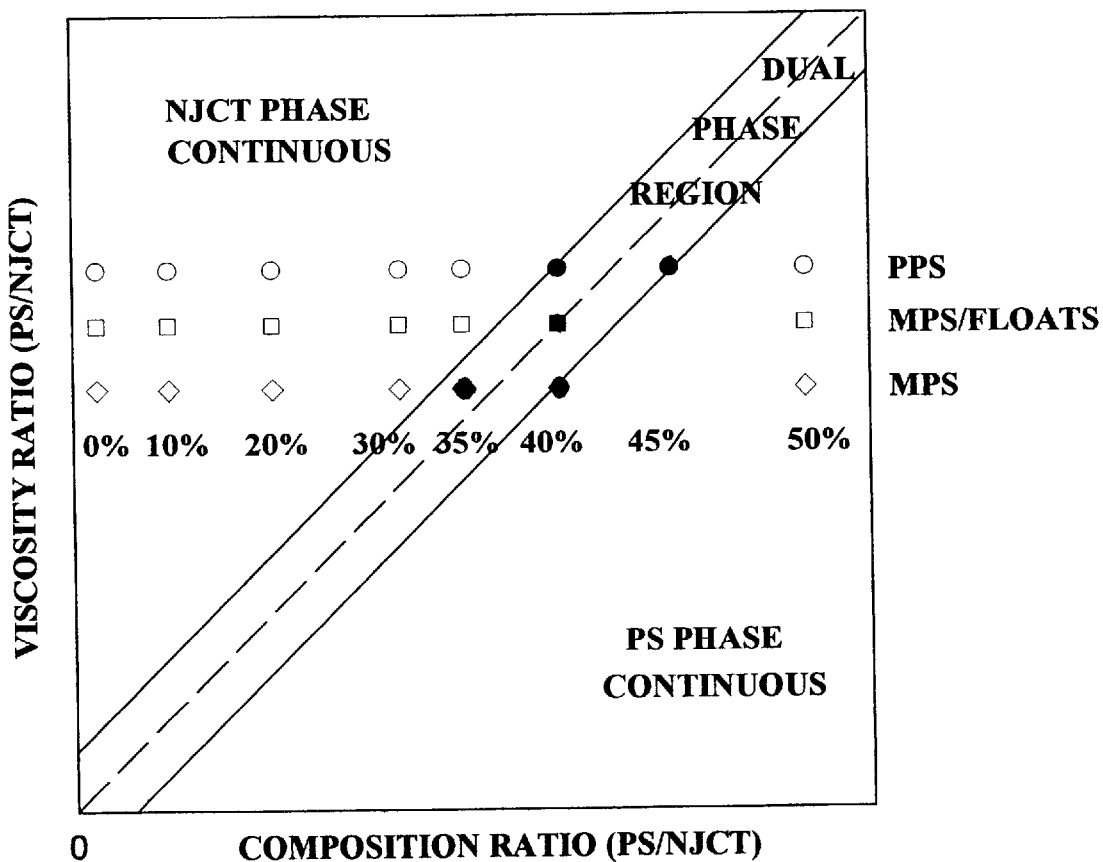
FIG. 2 illustrates the dual phase region for certain polystyrene/ polyolefin compositions.

FIG. 2 shows plots of viscosity ratio versus composition ratio for each of the three systems. This plot is similar to the one discussed previously. As the viscosity ratio for each system is assumed to be constant throughout the composition range, this plot for each system is therefore parallel to the composition ratio axis of the graph.

The darkened symbols represent compositions for which SEM micrographs indicate a dual phase co-continuous morphology is present. The dual phase region is indicated by the heavy dashed diagonal lines in the figure. The width of the dual phase region was determined experimentally from the known dual phase compositions. The shape of the region is merely an estimate. More experiments would have to be carried out in order to define the actual shape of the region. Sample compositions which plot above this region would be expected to have the polyolefin (NJCT) as the continuous phase while compositions which plot below this region would be expected to have polystyrene as the continuous phase.

TABLE 2

Volume Ratios and Viscosity Ratios of PS/NJCT Floats

| Sample Designation | Estimated Volume Percent PS/CT Floats at 220° C. | $\frac{\phi_{PS}}{\phi_{NJCT}}$ |
|---|---|---|
| 100% NJCT | 2.6/97.4 | .03 |
| 10% PS 90% NJCT | 11/89 | .12 |
| 20% PS 80% NJCT | 20/80 | .25 |
| 30% PS 70% NJCT | 29/71 | .41 |
| 35% PS 65% NJCT | 33/67 | .49 |
| 40% PS 60% NJCT | 38/62 | .61 |
| 45% PS 55% NJCT | 43/57 | .75 |
| 50% PS 50% NJCT | 48/52 | .92 |

$$\frac{\eta_{MPS}}{\eta_{NJCT}}(220°\ C.) = .53$$

$$\frac{\eta_{MPS}}{\eta_{NJCT}}(212°\ C.) = .61$$

$$\frac{\eta_{PPS}}{\eta_{NJCT}}(220°\ C.) = .68$$

From the foregoing description, one skilled in the art can easily ascertain the essential characteristics of this invention, and without departing from the spirit and scope thereof, can make various changes and modifications of the invention to adapt it to various usages and conditions.

We claim:

1. In a method of maintaining spacing between railroad rails by attachment of said rails to at least one railroad tie, the improvement wherein:
   said at least one railroad tie is formed from a plastic composite material comprising 20–50 wt % of a polystyrene component forming a first phase and 50–80 wt % of a polyolefin component forming a second phase, wherein said polystyrene component contains at least 90 wt % polystyrene and said polyolefin component contains at least 75 wt % high density polyethylene, and wherein said first phase and said second phase each form three dimensional networks that are integrated with one another within said composite material.

2. A method according to claim 1, wherein said composite comprises 25–45 wt % of said polystyrene component.

3. A method according to claim 1, wherein said composite comprises 30–40 wt % of said polystyrene component.

4. A method according to claim 1, wherein said polyolefin component contains at least 80 wt % high density polyethylene.

5. A method according to claim 1, wherein said polyolefin component contains at least 90 wt % high density polyethylene.

6. A method according to claim 1, wherein said polyolefin component comprises recycled polyolefin plastics.

7. A method according to claim 5, wherein said polystyrene component comprises recycled polystyrene plastics.

8. A method according to claim 1, wherein said polystyrene component comprises recycled polystyrene plastics.

9. A method according to claim 1, wherein said plastic composite material comprises 35 wt % of said polystyrene component.

10. A method according to claim 1, wherein said plastic composite material exhibits a compression modulus of at least 172,000 psi.

11. A method according to claim 1, wherein said plastic composite material exhibits a compression modulus of at least 200,000 psi.

12. A method according to claim 1, wherein said plastic composite exhibits a compression strength of at least 3000 psi.

13. A method according to claim 1, wherein said plastic composite exhibits a compression strength of at least 3500 psi.

14. A method according to claim 1, wherein said plastic composite material exhibits a compression yield stress of at least 3000 psi.

15. A method according to claim 1, wherein said plastic composite material exhibits a compression yield stress of at least 3500 psi.

16. A method according to claim 1, wherein said composite material has a coefficient of thermal expansion of less than about $6.5 \times 10^{-5}$ in/in-° F.

17. A method according to claim 1, wherein said composite material has a coefficient of thermal expansion of less than about $6.0 \times 10^{-5}$ in/in- °F.

18. A method according to claim 1, wherein said polyolefin component contains up to 25 wt % of polyvinyl chloride; middle, low and/or low linear polyethylene; polypropylene; polystyrene; polyethylene terephthalate; polyolefin copolymers; and mixtures thereof.

19. A method according to claim 1, wherein said polystyrene component contains expanded polystyrene.

20. A method according to claim 1, wherein said polystyrene component contains foamed polystyrene.

21. A method according to claim 1, wherein said at least one railroad tie is formed by:

introducing resin into an extruder, said resin comprising 20–50 wt % of a polystyrene component and 50–80 wt % of a polyolefin component, wherein the polystyrene component contains at least 90 wt % polystyrene and the polyolefin component contains at least 75 wt % high density polyethylene;

heating the resin within the extruder to convert the resin into a molten state;

extruding the molten material through a cooled die having at least one orifice in the shape of the cross-section of a railroad tie, wherein during passage through the cooled die an outer solid skin forms on the extruded material, said outer solid skin having a thickness sufficient to maintain the shape of the material through subsequent stages;

conveying the extruded material through subsequent cooling stages whereby the material is sufficiently cooled to permit cutting; and cutting the extruded material into desired lengths to form composite railroad ties.

22. In a method of providing a weight bearing support surface for railroad rails by attachment of said rails to at least one railroad tie, the improvement wherein:

said at least one railroad tie is formed from a plastic composite material comprising 20–50 wt % of a polystyrene component forming a first phase and 50–80 wt % of a polyolefin component forming a second phase, wherein said polystyrene component contains at least 90wt % polystyrene and said polyolefin component contains at least 75 wt. % high density polyethylene, and wherein said first phase and said second phase each form three dimensional networks that are integrated with one another within said composite material.

23. A method according to claim 22, wherein said at least one railroad tie is formed by:

introducing resin into an extruder, said resin comprising 20–50 wt % of a polystyrene component and 50–80 wt % of a polyolefin component, wherein the polystyrene component contains at least 90 wt % polystyrene and the polyolefin component contains at least 75 wt % high density polyethylene;

heating the resin within the extruder to convert the resin into a molten state;

extruding the molten material through a cooled die having at least one orifice in the shape of the cross-section of a railroad tie, wherein during passage through the cooled die an outer solid skin forms on the extruded material, said outer solid skin having a thickness sufficient to maintain the shape of the material through subsequent stages;

conveying the extruded material through subsequent cooling stages whereby the material is sufficiently cooled to permit cutting; and cutting the extruded material into desired lengths to form composite railroad ties.

24. In a method of maintaining spacing between railroad rails by attachment of said rails to at least one railroad tie, the improvement wherein:

said at least one railroad tie is formed by extruding a plastic melt blend containing a polystyrene component forming a first phase and a polyolefin component forming a second phase, wherein, within said plastic melt blend, the ratio of the viscosity of the polystyrene component to the viscosity of the polyolefin component is approximately equal to the ratio of the volume of the polystyrene component to the volume of the polyolefin component, and wherein said first phase and said second phase each form three dimensional networks that are integrated with one another within said composite material.

* * * * *